(12) United States Patent
Iwashita et al.

(10) Patent No.: US 6,636,535 B1
(45) Date of Patent: Oct. 21, 2003

(54) LASER APPARATUS

(75) Inventors: Yoshitaka Iwashita, Tokyo (JP); Akihiro Otani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 77 days.

(21) Appl. No.: 09/598,456

(22) Filed: Jun. 22, 2000

(30) Foreign Application Priority Data

Dec. 28, 1999 (JP) .......................................... 11-374274

(51) Int. Cl.⁷ .............................................. G01B 11/27
(52) U.S. Cl. ............................................ 372/6; 356/344
(58) Field of Search ............................. 356/153, 73.1, 356/400; 250/330, 338.1; 372/6

(56) References Cited

U.S. PATENT DOCUMENTS

| | | | | |
|---|---|---|---|---|
| 3,688,584 A | * | 9/1972 | Stone | 73/382 |
| 4,681,396 A | * | 7/1987 | Jones | 350/96.18 |
| 4,840,450 A | * | 6/1989 | Jones | 350/96.2 |
| 4,865,446 A | * | 9/1989 | Inoue | 356/216 |
| 4,984,885 A | * | 1/1991 | Ortiz | 356/153 |
| 5,323,009 A | * | 6/1994 | Harris | 250/458.1 |
| 5,383,118 A | * | 1/1995 | Nguyen | 700/59 |
| 5,621,831 A | * | 4/1997 | Staver | 385/33 |
| 6,089,741 A | * | 7/2000 | Chen | 362/583 |

FOREIGN PATENT DOCUMENTS

| | | | |
|---|---|---|---|
| DE | 195 39 558 C2 | 7/1996 | |
| JP | 9-181383 | 7/1997 | H01S/3/101 |
| JP | 11-112063 | 4/1999 | H01S/3/00 |

OTHER PUBLICATIONS

Patent Abstract of Japan, 09181383, Jul. 11, 1997.
Patent Abstract of Japan, 11112063, Apr. 23, 1999.

* cited by examiner

*Primary Examiner*—Paul Ip
*Assistant Examiner*—Dung Nguyen
(74) *Attorney, Agent, or Firm*—Sughrue Mion, PLLC

(57) ABSTRACT

A laser apparatus which has a laser resonator 2 for emitting a laser beam 8, an optical fiber 23, on which the laser beam 8 transmitted from the laser resonator 2 through a beam transmission optical path is made incident, for transmitting the laser beam 8 to a workpiece, a measurement and adjustment jig 44 for measuring laser beam output of an annular pattern occurring in the periphery of a beam pattern of the laser beam 8 emitted from the optical fiber 23, and a fiber incidence section 22 for adjusting incidence of the laser beam 8 on the optical fiber 23 based on output from the measurement and adjustment jig 44.

5 Claims, 13 Drawing Sheets

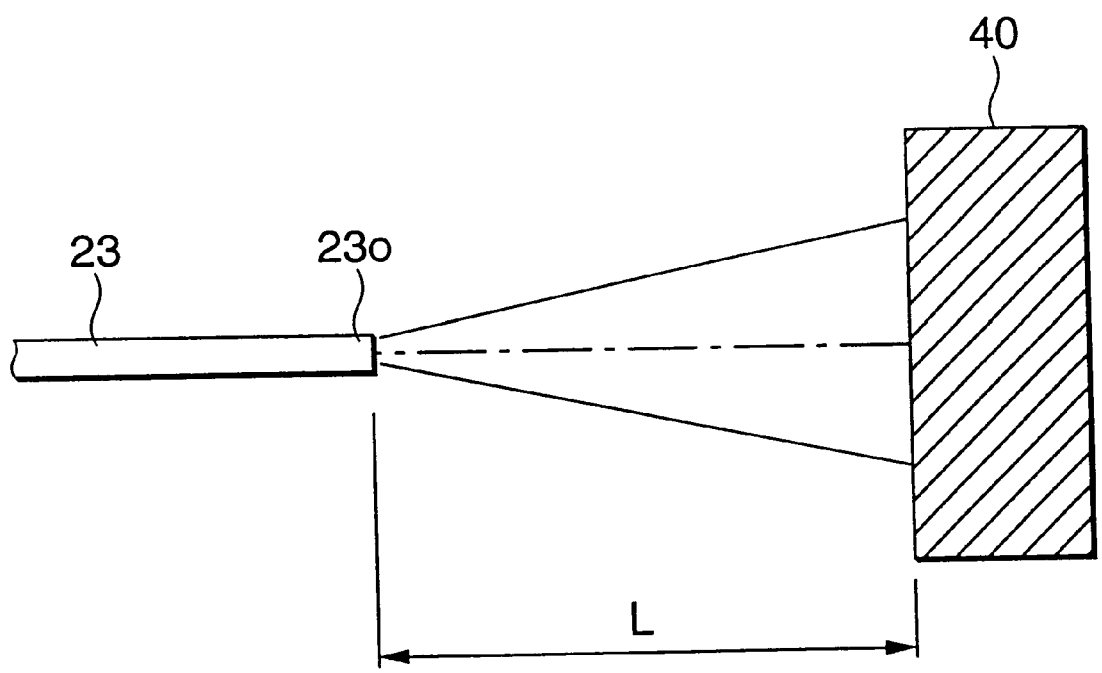

LASER APPARATUS

BACKGROUND OF THE INVENTION

This invention relates to a laser apparatus and in particular to fiber adjustment of the laser apparatus.

A solid-state laser apparatus will be discussed as an example of the laser apparatus.

FIG. 10 is a schematic diagram to show an oscillator head and a laser beam path of a solid-state laser apparatus in a related art. Numeral 1 denotes an oscillator head, numeral 2 denotes a resonator, numeral 3 denotes a partial reflecting mirror, numeral 4 denotes a total reflecting mirror, numeral 5 denotes an excitation light source, numeral 6 denotes a solid-state component of an excitation medium, numeral 7 denotes a cavity (box) containing the excitation light source 5 and the solid-state component 6, numeral 8 denotes a laser beam emitted from the resonator 2, numeral 9 denotes a magnifying lens, numeral 10 denotes a collimating lens, numeral 11 denotes a beam shutter, numeral 12 denotes a reflecting mirror, numeral 14 denotes a damper, numeral 20 denotes a condensing lens, numeral 21 denotes a fiber holder, numeral 22 denotes a fiber incidence section having the condensing lens 20 and the fiber holder 21, numeral 23 denotes an optical fiber, numeral 24 denotes a machining head, and numerals 25a and 25b denote machining lenses.

The operation of the described solid-state laser apparatus is as follows: In the laser apparatus in FIG. 10, the solid-state component 6 is excited by excitation light of the excitation light source 5 and the partial reflecting mirror 3 and the total reflecting mirror 4 placed so as to sandwich the solid-state component 6 cause lasing to occur. The laser beam 8 emitted from the resonator 2 is widened after passing through the magnifying lens 9 and becomes a collimated beam after passing through the collimating lens 10, and the collimated laser beam is incident on the fiber incidence section 22.

The beam shutter 11 is placed between the collimating lens 10 and the fiber incidence section 22, so that the laser beam 8 can be shut off when it is not wanted to emit the laser beam 8 to the outside of the laser oscillator. The beam shutter 11 consists of the reflecting mirror 12 for reflecting the laser beam 8 and the damper 14 for absorbing the laser beam 8 and converting it into heat. The reflecting mirror 12 is movable. When the reflecting mirror 12 is at a position A, the laser beam 8 passes through the beam shutter 11; when the reflecting mirror 12 is at a position B, the laser beam 8, is reflected on the reflecting mirror 12 to the damper 14. The surface of the damper 14 is formed of a laser beam absorber for converting energy of the laser beam 8 into heat. Although not shown, the damper 14 is water-cooled for releasing the amount of heat absorbed.

The collimated laser beam 8 incident on the fiber incidence section 22 is gathered by the condensing lens 20 in the fiber incident section, and is incident on an end face 23i of the optical fiber 23 held by the fiber holder 21, and propagates in the optical fiber 23. adjustment in an optical axis direction to match the optical axis direction position of the focus of the gathered laser beam 8 with the optical fiber incidence end 23i, and the fiber holder 21 is made movable for adjustment in a direction perpendicular to the optical axis to match the focus position with the center of the plane of the optical fiber incidence end 23i.

The laser beam 8 passing through the optical fiber 23 is emitted from an emission end 23o of the optical fiber 23 connected to the machining head 24. The laser beam 8 guided into the machining head 24 is gathered by the condensing lenses 25a and 25b and is used for machining, etc.

The fiber incidence section 22 is adjusted seeing the characteristic of the laser beam 8 emitted from the emission end 23o of the optical fiber 23.

Generally, in the solid-state laseroscillator, the light quantity of the excitation light source 5 is changed to change oscillation output. That is, the heat energy given to the solid-state component 6 is changed and by extension optical heat distortion of the solid-state component 6 itself changes. Specifically, the solid-state component 6 is cooled from the periphery, thus the temperature of the center becomes higher than that of the periphery and the solid-state component 6 has remarkably a nature like a convex lens; the strength degree of the convex lens changes. In this kind of solid-state laser oscillator, the characteristic of the solid-state component 6 in the resonator as the lens changes, thus if the strength of the excitation light source 5, namely, output of the laser beam 8 is changed, the propagation characteristic of the laser beam 8 emitted from the resonator 2 changes and consequently the optimum adjustment value of the fiber incidence section 22 changes.

Therefore, to make the above-described adjustment, it is necessary to cause 500-W lasing to occur to machine in 500 W in a laser oscillator of output equivalent used for actual machining, for example, rated output 500-W output; otherwise, the propagation characteristic of the laser beam 8 at the adjustment time differs largely from that at the actual machining time, and the reliability of the adjustment itself is impaired.

The above-described adjustment is made finally with the laser beam 8 of machining output of high output. When adjustment to the fiber incidence section 22 differs largely from the optimum position, if the laser beam 8 of high output is made incident on the fiber incidence section 22 suddenly, there is a possibility that the optical fiber 23 and any other part will be damaged. Then, the fiber incidence section 22 is adjusted in such low output as not to damage the optical fiber 23 or any other part and while output is increased gradually, adjustment of the fiber incidence section 22 is repeated. Finally, the adjustment is made in actual machining output, then is completed.

FIG. 11 shows a solid-state laser apparatus as an example of a laser apparatus in another related art. The laser apparatus differs from that previously described with reference to FIG. 10 in beam shutter section structure. In the laser apparatus shown in FIG. 11, numeral 30 denotes a beam absorber and numeral 31 denotes a reflecting mirror. The reflecting mirror 31 has a little, for example, 0.2% passing characteristic, namely, reflects most of an incident laser beam 8 and allows some output to pass through. The laser beam 8 passing through is absorbed in the beam absorber 30. The beam absorber 30 acts as a laser beam shield. It is placed so that the beam absorber 30 can be removed from the rear of the reflecting mirror 30, so that the laser beam 8 passing through the reflecting mirror 31 can be made incident on a fiber incidence section 22 as required.

The operation of the laser apparatus shown in FIG. 11 is as follows: To adjust an optical path in an oscillator shown in FIG. 11, the beam shutter is closed, namely, the reflecting mirror 31 is set to a position of B and the beam absorber 30 is removed, then the laser oscillator is made to laser in output equivalent to that at the actual machining time, for example, 500 W. Then, the laser beam 8 reflected on the reflecting mirror 31 is absorbed in a damper 14 and a laser beam of small output passing through the reflecting mirror, in the example, 500 W×0.2%=1 W is emitted from an oscillator exit, namely, a condensing lens 20. At this time, input to a solid-state component 6 is equivalent to that at the actual machining time, thus optical heat distortion of the solid-state component 6 is equivalent to that at the actual machining time and therefore the propagation characteristic of the laser beam 8 emitted from a resonator is equivalent to that at the actual machining time.

At this time, the propagation characteristic of the laser beam 8 passing through the reflecting mirror 31 is equivalent to that at the actual machining time. Moreover, output of the laser beam 8 passing through the reflecting mirror 31 is small. Thus, if the laser beam is made incident on an incidence end 23i of an optical fiber 23 in an entirely unadjusted state, there is not a fear of damaging the optical fiber 23, etc.

Therefore, if an adjustment is made to the fiber incidence section 22 in the state, it can be made in a state equal to that at the actual machining time with respect to optical heat distortion of the solid-state component 6 from the beginning, eliminating the need for making intricate adjustment to the laser apparatus shown in FIG. 10 in such a manner that first a rough adjustment is made in such small output as not to damage the optical fiber 23, etc., then while adjustment output is increased gradually, adjustment is repeated more than once and finally, full-scale adjustment is made in actual machining output; the fiber incidence section 22 can be adjusted easily in a short time.

That is, in the solid-state laser apparatus previously described with reference to FIG. 11, the effect of the optical heat distortion of the solid-state component itself little introduces a problem.

After the termination of the adjustment, the beam absorber 30 is restored to the former position.

In the solid-state laser apparatuses as previously described with reference to FIGS. 10 and 11, hitherto, GI-type optical fibers have been often used. However, in recent years, SI-type optical fibers have been used increasingly in place of the GI-type optical fibers. The SI-type optical fiber has the advantage that the optical damage threshold can be increased about double digits as compared with the GI-type optical fiber, so that the demand for the SI-type optical fibers grows with high output of recent laser apparatuses.

When the optical fiber is an Si-type optical fiber, namely, is a fiber such that it has a refractive index changing stepwise on the boundary between the fiber core and clad, if all laser beam is incident on the fiber core at the fiber incidence end, total incident beam is transmitted in the core. In many cases, the incident beam diameter at the fiber incidence end is about 90% of the core diameter or less and allows the total incident beam to be incident on the core in the range thereof.

On the other hand, if a part of the laser beam cannot enter the fiber core because the optical axis shifts at the fiber incidence end or for any other reason, clad propagation in the fiber occurs.

Thus, if the SI-type optical fiber is used, the fiber incidence section 22 is adjusted while whether or not the above-mentioned clad propagation occurs is determined. That is, the fiber incidence section 22 is adjusted while the laser beam strength distribution after fiber emission is checked. To check the laser beam strength distribution, for example, a laser power meter 40 is placed at a position at a proper distance L from the fiber emission end 23o, a laser beam after fiber emission is applied to the laser power meter 40, and a beam pattern on the laser power meter 40 is observed with an IR scope for visualizing an invisible laser beam or the like, as shown in FIG. 12.

FIGS. 13A and 13B show observed beam patterns after fiber emission. When a total incident laser beam propagates in the core, a circular pattern 50a results as shown in FIG. 13A. On the other hand, if clad propagation occurs because of an adjustment failure, the brightness of the circular pattern 50a at the center, namely, the beam strength lessens and an annular pattern 50b appears on the outer periphery of the circular pattern 50a, forming a double circle pattern, as shown in FIG. 13B. The double circle pattern also occurs if an adjustment difference occurs in any direction from the optimum adjustment value.

The fiber incidence section 22 is adjusted so that the observed beam patterns after fiber emission becomes a circular pattern as shown in FIG. 13A. The optimum adjustment value in output at the adjustment time lies in an intermediate of the adjustment values for causing a double circle pattern to appear (two in one direction).

As described above, in the laser oscillators in the related arts, if the SI-type optical fiber is used, to adjust the fiber incidence section at the maintenance time, etc., appropriate measurement and adjustment means are not available and the fiber incidence section is adjusted based on a determination made by a visual inspection of an actual beam after fiber emission. Thus, it is necessary to repeat an adjustment while output is increased gradually; it takes time. A skill is required to determine the optimum adjustment value by a visual inspection.

SUMMARY OF THE INVENTION

It is therefore an object of the invention to provide a laser apparatus for making it possible to make a precise and objective optical path adjustment and fiber incidence section adjustment easily in a short time if an SI-type optical fiber is used as an optical fiber.

According to the invention, there is provided a laser apparatus comprising a laser resonator for emitting a laser beam, an optical fiber, on which the laser beam transmitted from the laser resonator through a beam transmission optical path is made incident, for transmitting the laser beam to a workpiece, laser beam output measurement means for measuring laser beam output of an annular pattern occurring in the periphery of a beam pattern of the laser beam emitted from the optical fiber, and fiber incidence adjustment means for adjusting incidence of the laser beam on the optical fiber based on output from the laser beam output measurement means.

The laser beam output measurement means comprises an aperture member having an opening for allowing the annular pattern occurring in the periphery of the beam pattern of the laser beam to pass through and a power meter for measuring laser beam output of the laser beam passing through the opening.

The opening of the aperture member is placed at a position corresponding to the NA value of the optical fiber used.

The laser beam output measurement means comprises a first aperture member having a first opening for allowing the annular pattern occurring in the periphery of the beam pattern of the laser beam to pass through, a second aperture member having a second opening for allowing a circular pattern occurring in the center of the beam pattern to pass through, and a power meter for measuring laser beam output of the laser beam passing through the first or second opening.

The laser beam output measurement means has the first and second aperture members that can be replaced together with hold members.

The laser beam output measurement means comprises a first aperture member having a first opening for allowing the annular pattern occurring in the periphery of the beam pattern of the laser beam to pass through and a second opening for allowing a circular pattern occurring in the center of the beam pattern to pass through, the first and second openings being switched exclusively for use, and a power meter for measuring laser beam output of the laser beam passing through the first or second opening.

BRIEF DESCRIPTION OF THE DRAWINGS

In the accompanying drawings:

FIG. 12 is a schematic representation to show a strength distribution check method of a beam after fiber emission in the solid-state laser apparatuses in the related arts.

DETAILED DESCRIPTION OF THE PREFERRED EMBODIMENTS

First Embodiment

Figure 1:
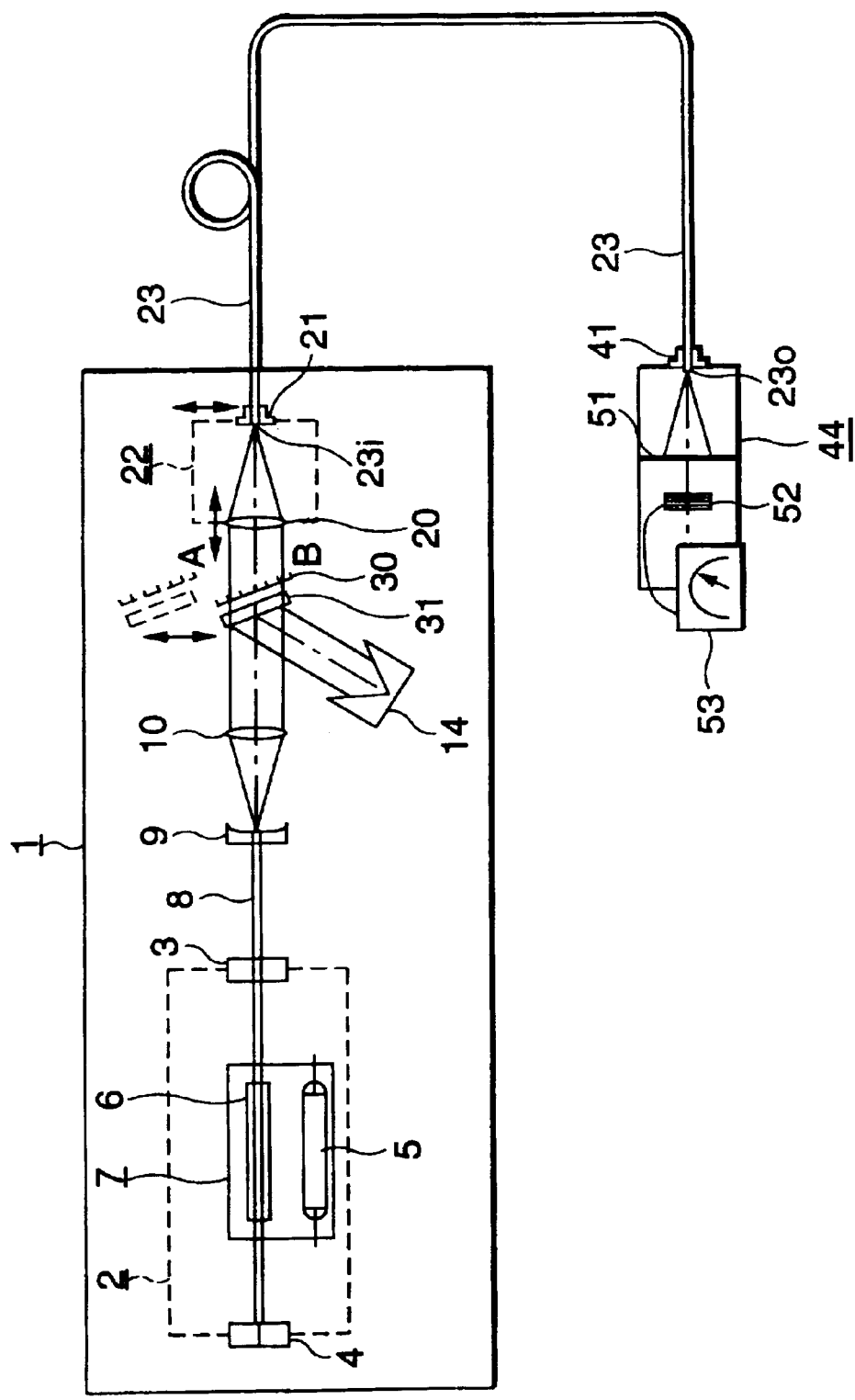
FIG. 1 is a schematic diagram to show the configuration of a solid-state laser apparatus according to a first embodiment of the invention.

A laser oscillator according to a first embodiment of the invention will be discussed with reference to FIGS. 1 and 2. FIG. 1 is a schematic diagram to show the configuration of a solid-state laser apparatus according to the first embodiment of the invention and FIG. 2 is a schematic diagram to show the configuration of an adjustment jig.

Figure 11:
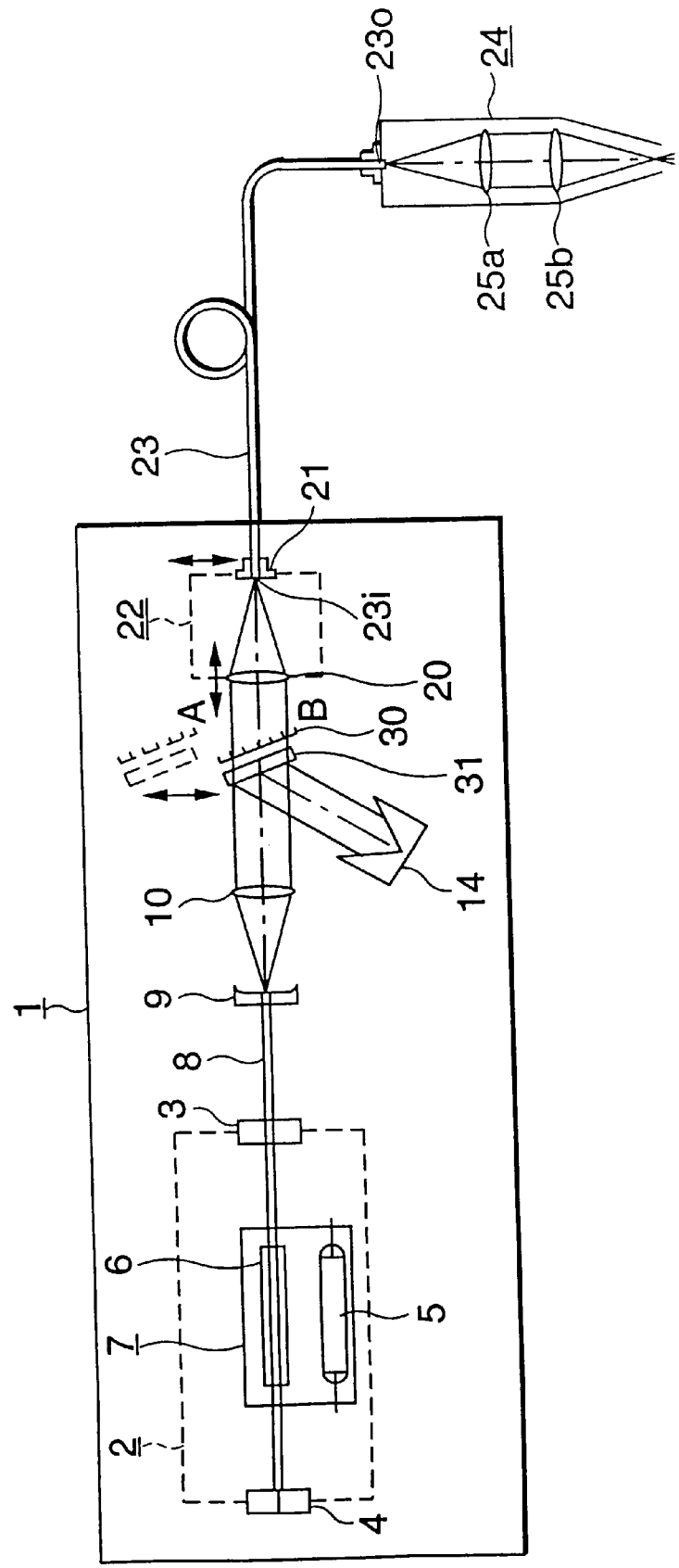
FIG. 11 is a schematic diagram to show the configuration of a solid-state laser apparatus in another related art.
Figure 13A:
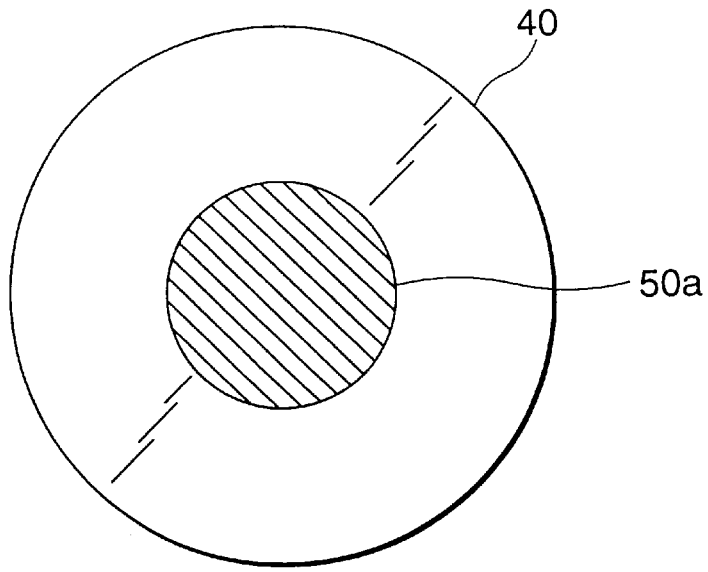
FIGS. 13A and 13B are drawings to show beam patterns after fiber emission.
Figure 13B:
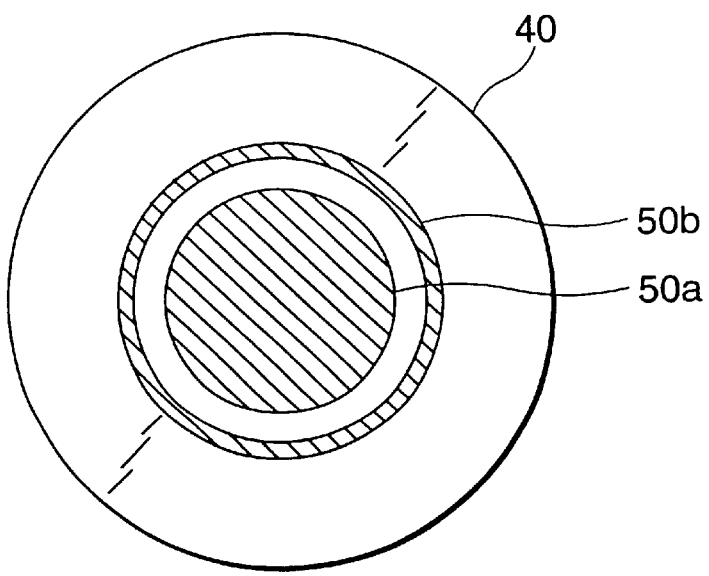

The laser apparatus shown in FIG. 1 differs from the laser apparatus in the related art previously described with reference to FIG. 11 in the structure of emission end 23o of optical fiber 23. This structure will be discussed. Other parts of the laser apparatus in FIG. 1 are similar to those of the laser apparatus in FIG. 11. In FIG. 1, parts denoted by reference numerals 1 to 10, 14, 20 to 23, 23i, 23o, 30, and 31 are identical with or similar to those denoted by the same reference numerals in FIG. 11 and therefore will not be discussed again.

In FIG. 1, numeral 44 denotes a measurement and adjustment jig as laser beam output measurement means. To make a position adjustment to a fiber incidence section 22 as fiber incidence adjustment means, namely, a movable condensing lens 20 and a fiber holder 21, the measurement and adjustment jig 44 is connected to the fiber emission end 23o. In the measurement and adjustment jig 44 shown in FIGS. 1 and 2, numeral 51 denotes an aperture, numeral 52 denotes a power meter, and numeral 53 denotes a display section.

Figure 2:
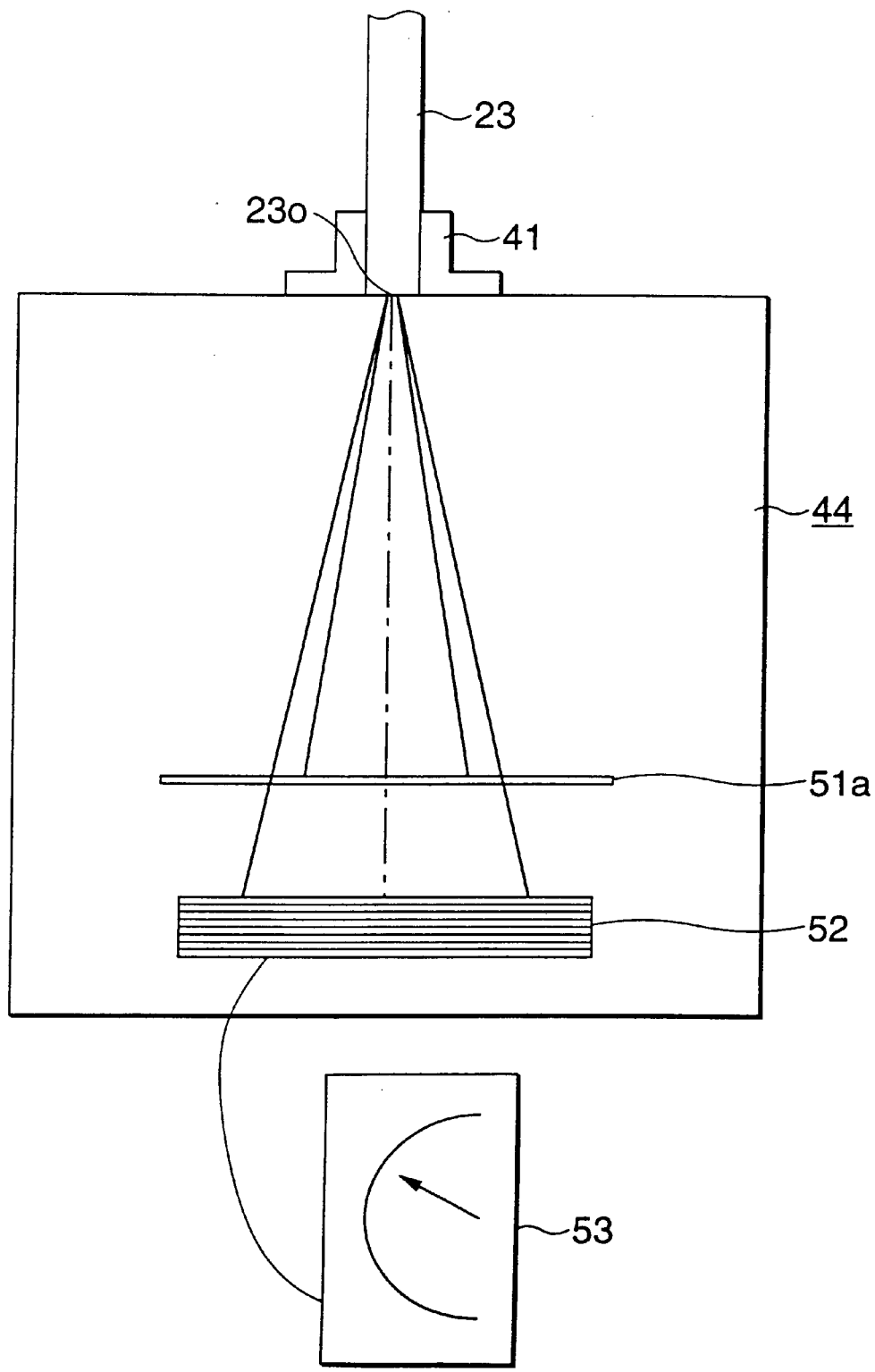
FIG. 2 is a schematic diagram to show the configuration of a measurement and adjustment jig according to the first embodiment of the invention.

FIG. 2 shows an aperture 51a for determining whether or not clad propagation occurs to adjust the fiber incidence section 22 if an SI-type optical fiber is used. The aperture 51a in FIG. 2 is placed at a laser beam measurement position and has an opening set at a position through which an outer ring-like laser beam of a double circle pattern occurring if clad propagation occurs passes at the aperture position, and output of a laser beam passing through the opening of the aperture 51a is measured with the power meter 52 and is displayed on the display section 53.

The operation is as follows: In FIG. 2, a laser beam emitted from the output end 23o of the optical fiber 23 propagates while it is spread as shown. If clad propagation occurs because of a fiber adjustment failure, output of an outer ring-like laser beam of a double circle pattern is elevated, the percentage of the laser beam passing through the aperture 51a increases, and a detection value of the power meter 52 becomes large. As the adjustment becomes better, the percentage of the laser beam passing through the aperture 51a becomes relatively smaller and the detection value of the power meter 52 becomes smaller.

Figure 3:
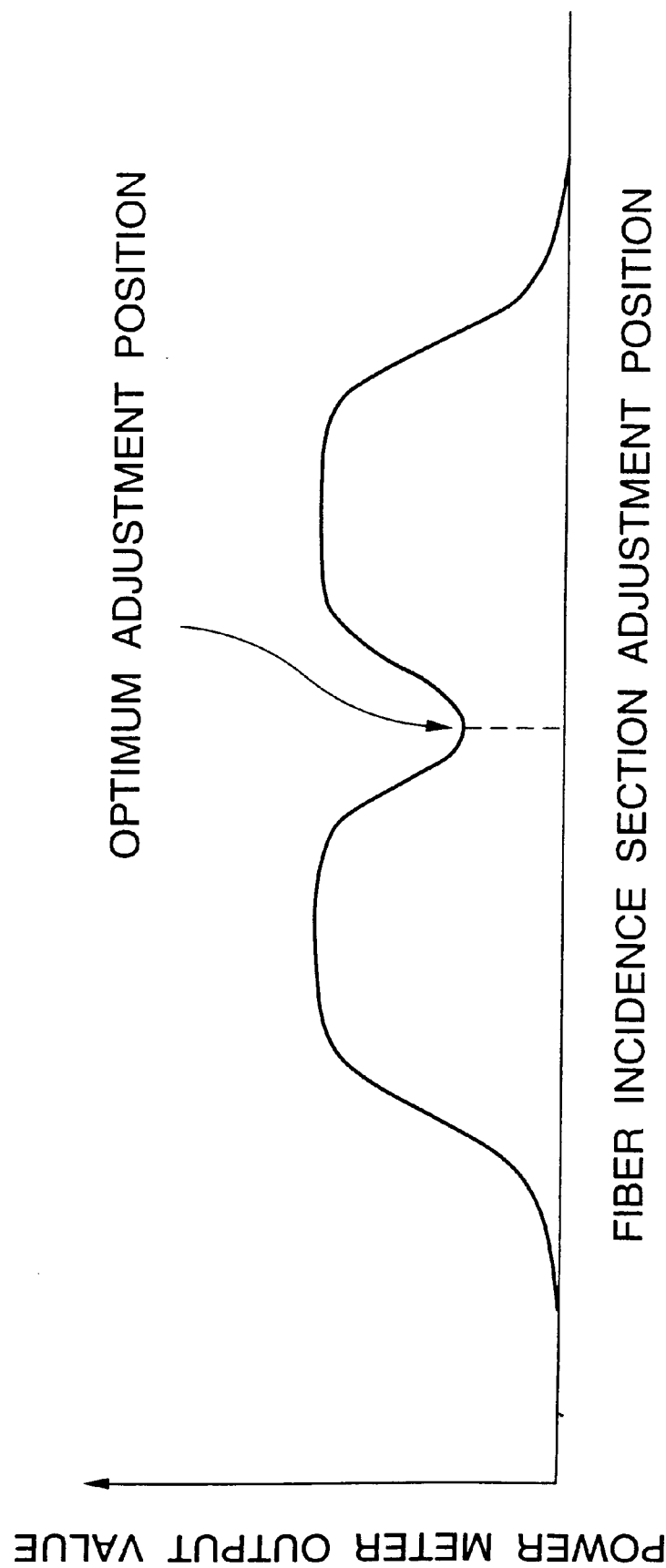
FIG. 3 is a drawing to show the relationship between the adjustment position of a fiber incidence section with the measurement and adjustment jig shown in FIG. 2 and the indication value of a power meter.

FIG. 3 shows the relationship between the adjustment position of the fiber incidence section 22 and the output value detected by the power meter 52. As shown here, the fiber incidence section 22 is adjusted to the position where the detection value of the power meter 52 reaches the minimum, whereby the fiber incidence section 22 can be adjusted to a good condition. The power meter 52 is capable of converting laser beam output into an electric signal and therefore in the laser apparatus according to the embodiment, the adjustment state of the fiber incidence section 22 is monitored as an electric signal.

Figure 4:
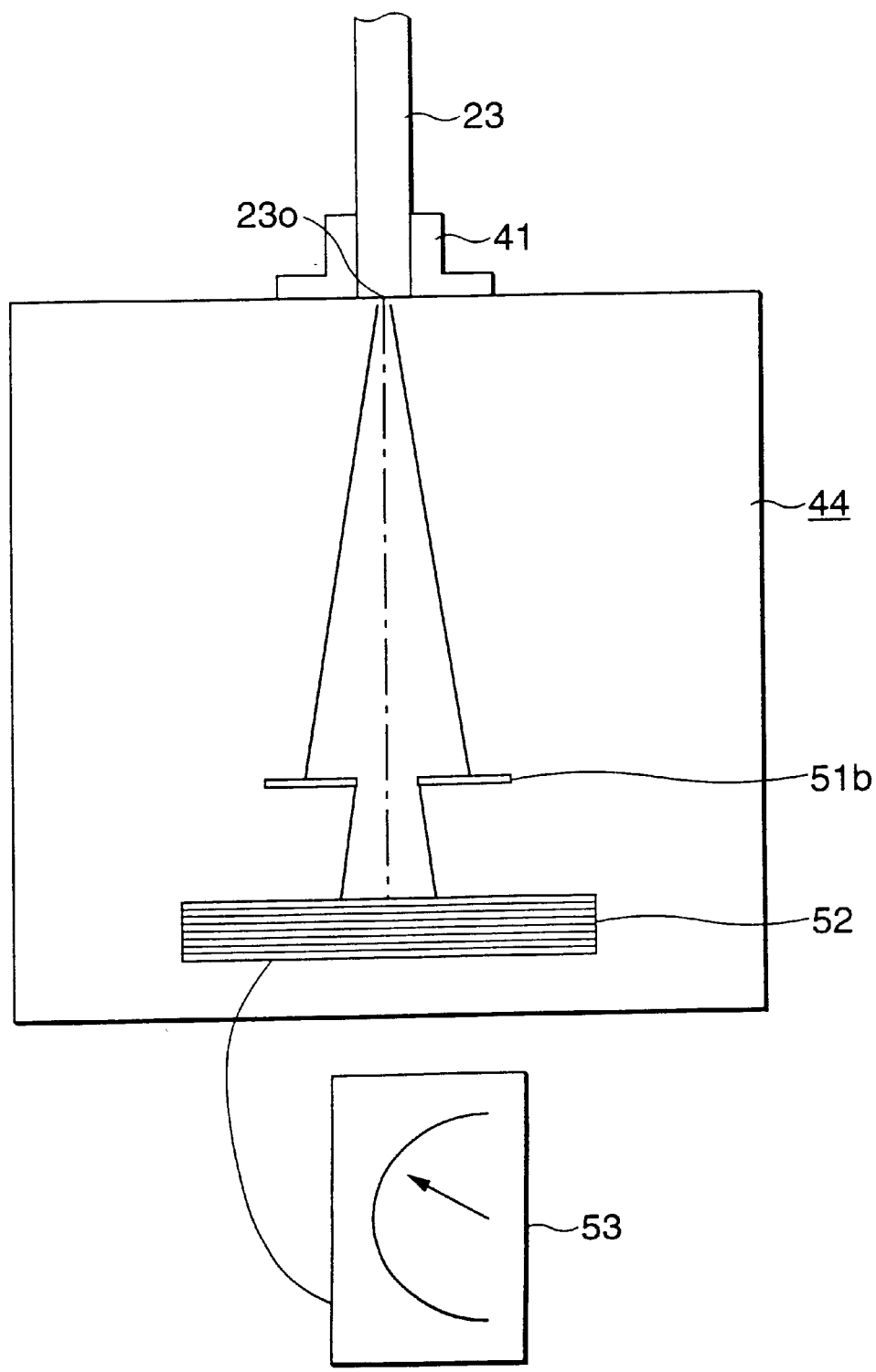
FIG. 4 is a schematic diagram to show the configuration of another measurement and adjustment jig according to the first embodiment of the invention.

FIG. 4 shows a measurement and adjustment jig comprising an aperture different from that shown in FIG. 2. Unlike the measurement and adjustment jig shown in FIG. 2, an aperture 51b has an opening placed at the center of a laser beam with the inner diameter of the opening set smaller than the laser beam diameter at the aperture position, and output of the laser beam passing through the opening is measured with a power meter 52. If adjustment to the fiber incidence section 22 becomes a failure and clad propagation occurs, the percentage of the laser beam passing through the opening of the aperture 51b becomes small and the detection value of the power meter 52 becomes small. If adjustment to the fiber incidence section 22 is good, the percentage of the laser beam passing through the opening of the aperture 51b becomes relatively large and the detection value of the power meter 52 becomes large.

Figure 5:
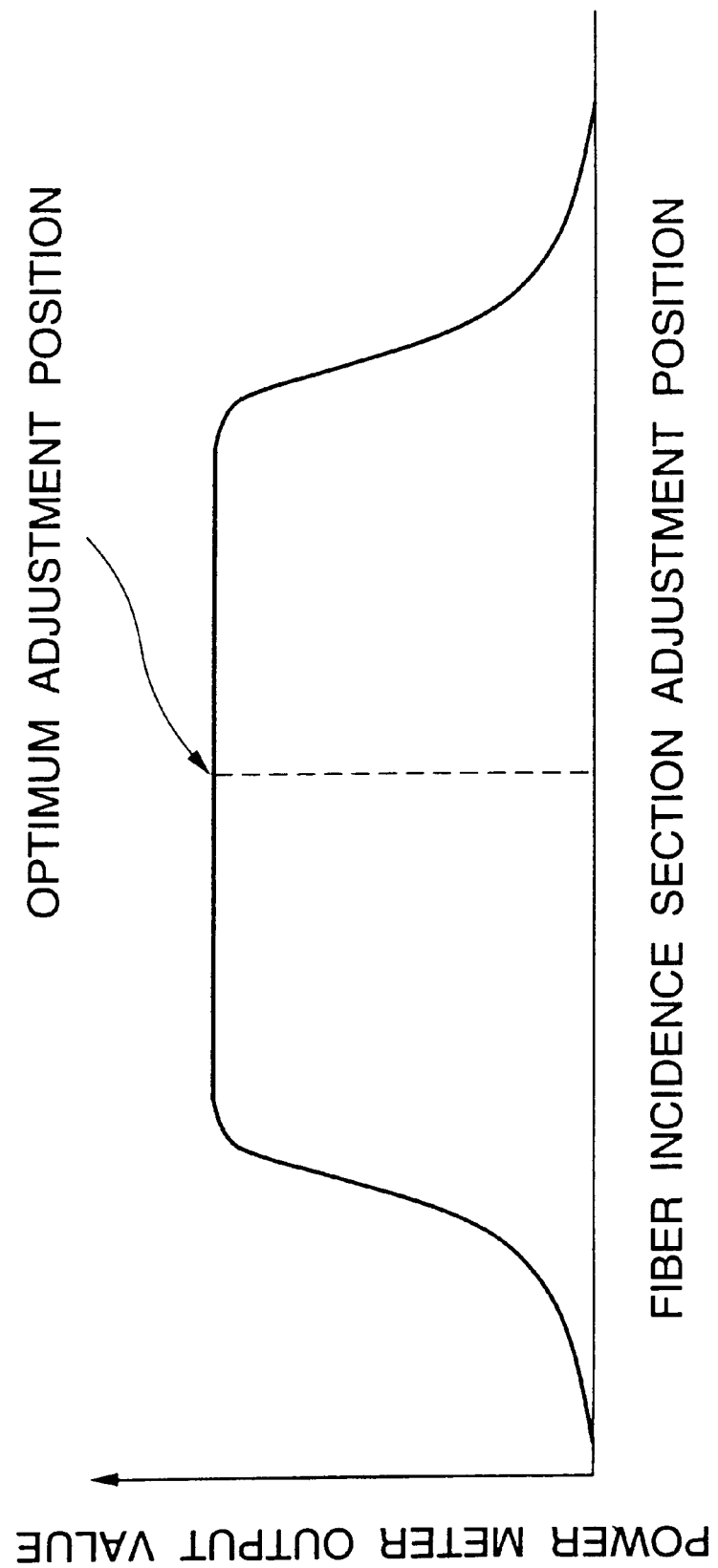
FIG. 5 is a drawing to show the relationship between the adjustment position of a fiber incidence section with the measurement and adjustment jig shown in FIG. 4 and the indication value of a power meter.

FIG. 5 shows the relationship between the adjustment position of the fiber incidence section and the output value detected by the power meter. As shown here, the fiber incidence section is adjusted so that the detection value of the power meter 52 reaches the maximum, whereby the fiber incidence section can be adjusted to a good condition. The power meter is capable of converting laser beam output into an electric signal; in the embodiment, the adjustment state of the fiber incidence section 22 is monitored as an electric signal.

However, in the adjustment method with the measurement and adjustment jig shown in FIG. 4, the output value of the power meter 52 changes only a little until clad propagation occurs; it is difficult to detect the optimum value. Therefore, the adjustment method is suitable to coarse adjustment for adjusting the fiber incidence section 22 to a position not causing clad propagation to occur as the stage preceding execution of the adjustment method with the measurement and adjustment jig shown in FIG. 2.

As compared with the adjustment with the measurement and adjustment jig shown in FIG. 4, the measurement and adjustment jig shown in FIG. 2 makes it possible to facilitate adjustment to t he optimum value. However, if a large shift from the optimum adjustment position occurs as shown in FIG. 3, the output value of the power meter 52 becomes small, thus there is a possibility that adjustment may become impossible. Therefore, adjustments with the measurement and adjustment jigs shown in FIGS. 2 and 4 are made properly, whereby a more precise adjustment can be made in a short time.

The aperture 51a shown in FIG. 2 has the opening set at a position through which an outer ring-like laser beam of a double circle pattern occurring if clad propagation occurs passes at the aperture position; the outer ring of the double circle pattern appears at a position determined based on NA of a fiber. For example, to use a fiber with NA=0.2, the outer ring occurs at the position of divergence angle (½ angle) tan θ=0.2. Therefore, placing the aperture 51a at a position corresponding to the position of NA is the best and the aperture 51a is configured so.

Second Embodiment

Figure 6:
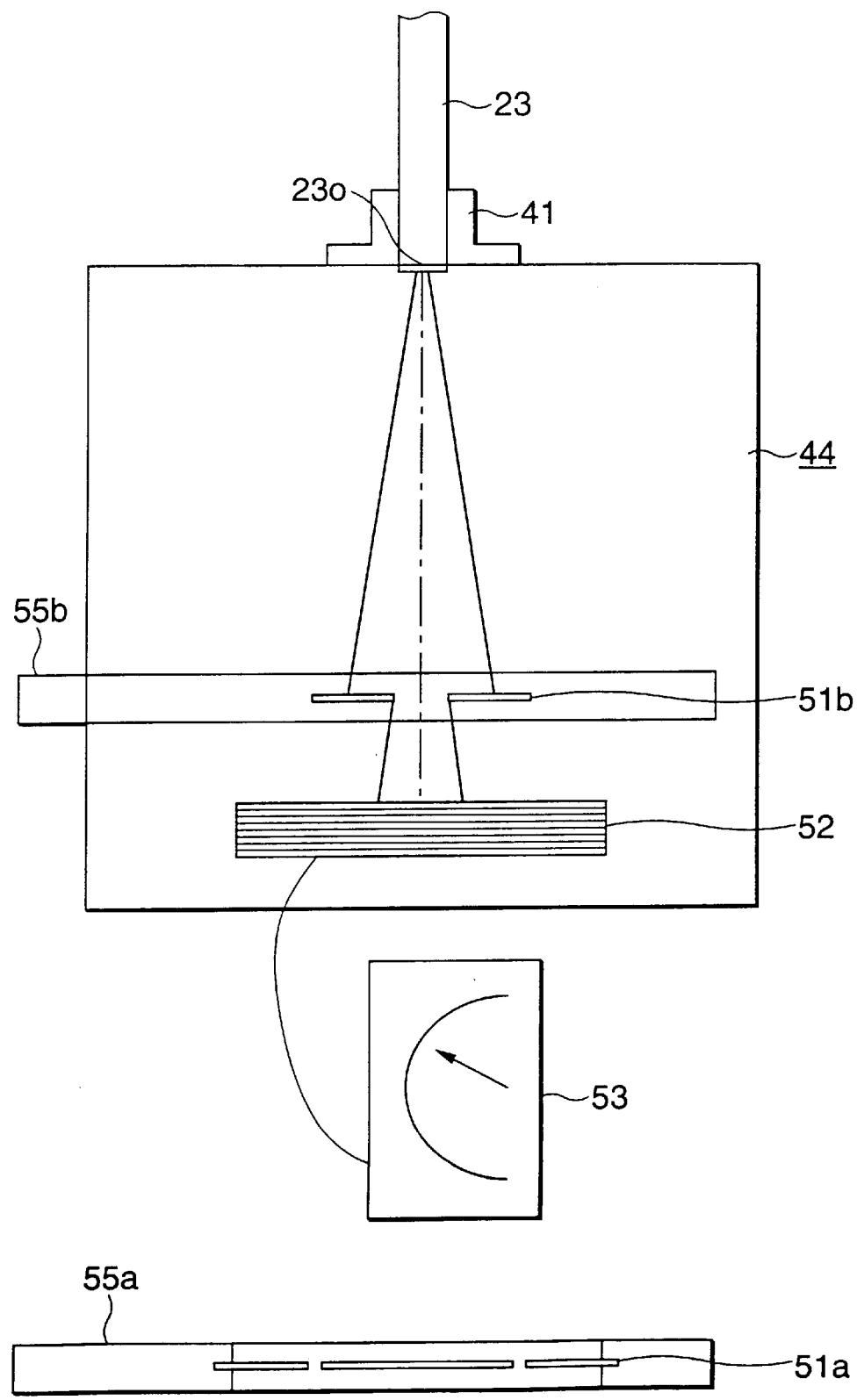
FIG. 6 is a schematic diagram to show the configuration of a measurement and adjustment jig according to a second embodiment of the invention.

FIG. 6 is a schematic diagram to show the configuration of an adjustment jig 44 according to a second embodiment of the invention. In the adjustment jig 44 shown in FIG. 6, apertures are fixed to detachable trays, so that apertures 51a and 51b described in the first embodiment are replaced together with trays 55a and 55b, whereby the apertures 51a and 51b can be easily replaced. According to this structure, two steps of adjustments to a fiber incidence section 22, namely, a coarse adjustment using the aperture 51a and an optimum value adjustment using the aperture 51b can be made easily.

Third Embodiment

Figure 7:
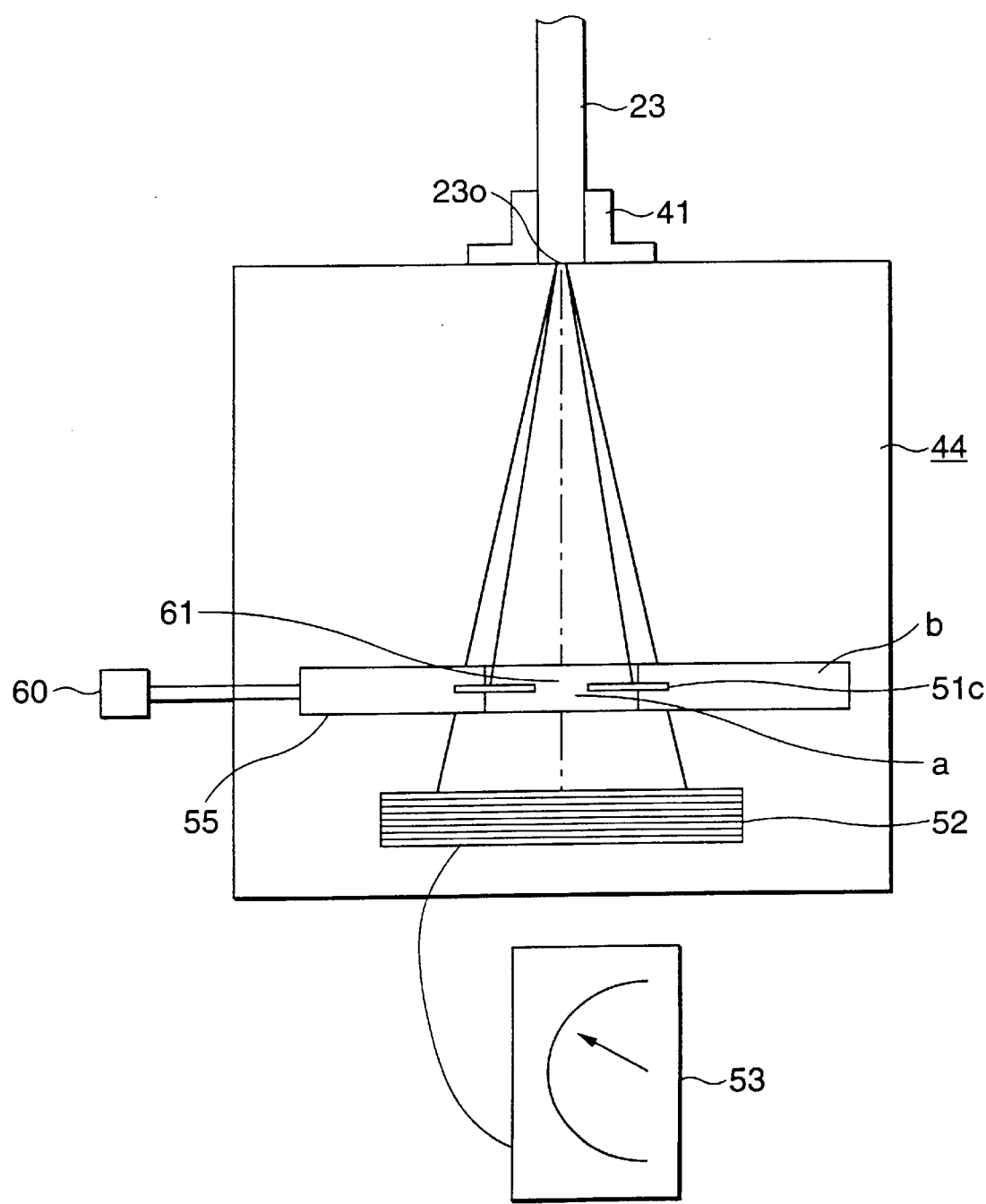
FIG. 7 is a schematic diagram to show the configuration of a measurement and adjustment jig according to a third embodiment of the invention.

In the second embodiment, the apertures 51 can be replaced. As shown in FIG. 7, one aperture 51c may have an opening 61 that can be switched to a laser beam center position a corresponding to the aperture 51a and a position b corresponding to the aperture 51b through which an outer ring-like laser beam of a double circle pattern occurring if clad propagation occurs passes. To change the opening position, for example, a screw 60 may be used to move the opening 61 of the aperture 51c to the positions a and b.

Figure 8:
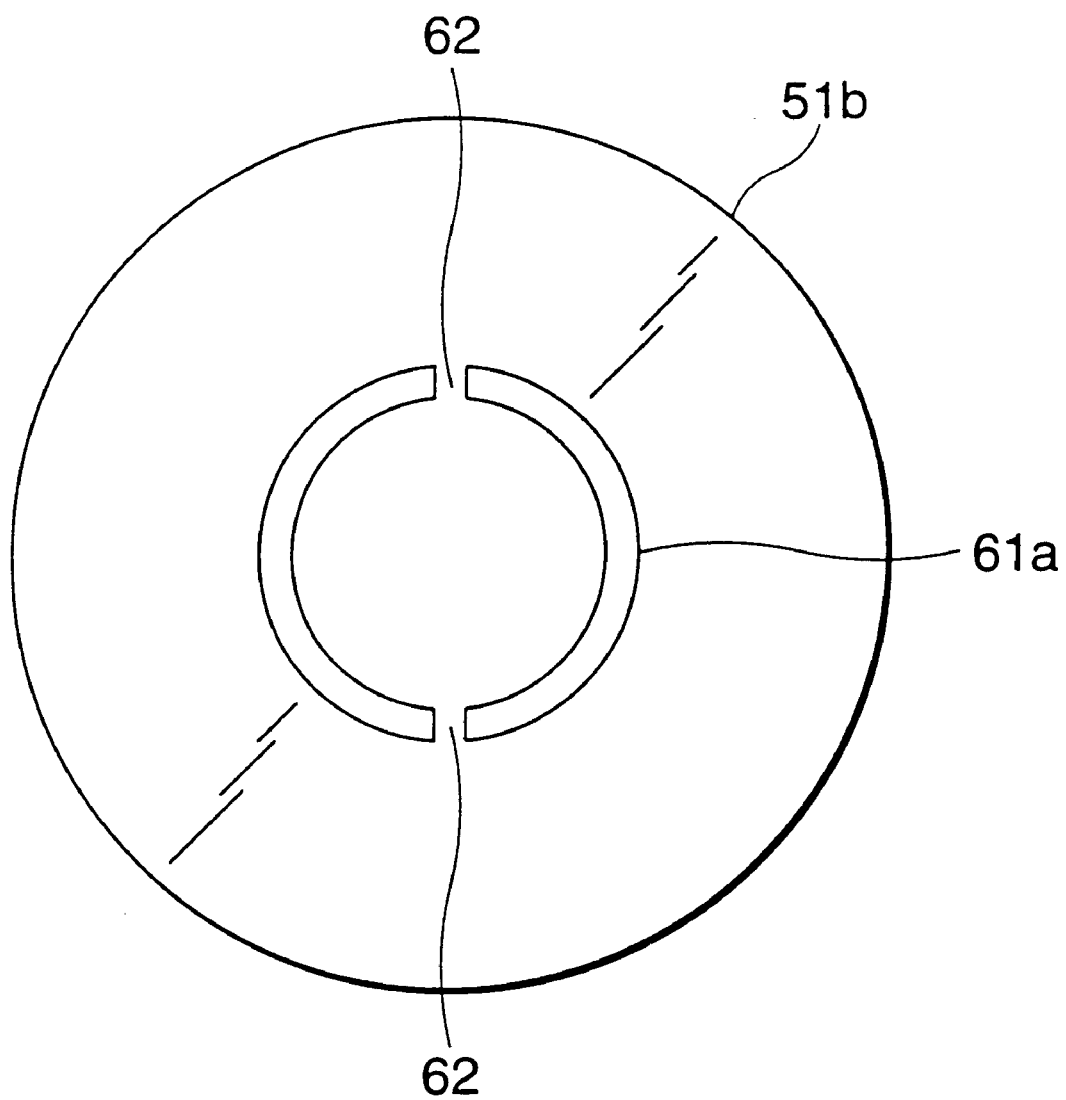
FIG. 8 is a drawing to show the structure of an aperture according to the embodiment of the invention.

An example of the shape of the aperture 51a will be discussed with reference to FIG. 8. The aperture 51a has a roughly annular opening 61a joined to the outer periphery by two bridges 62. This roughly annular opening 61a makes it possible to detect an annular laser beam occurring when clad propagation occurs over almost full circumference, and a sensible adjustment can be made. In FIG. 8, the two bridges 62 are provided, but any number of bridges may be placed if a roughly annular opening is provided; a similar advantage can be provided.

Figure 9:
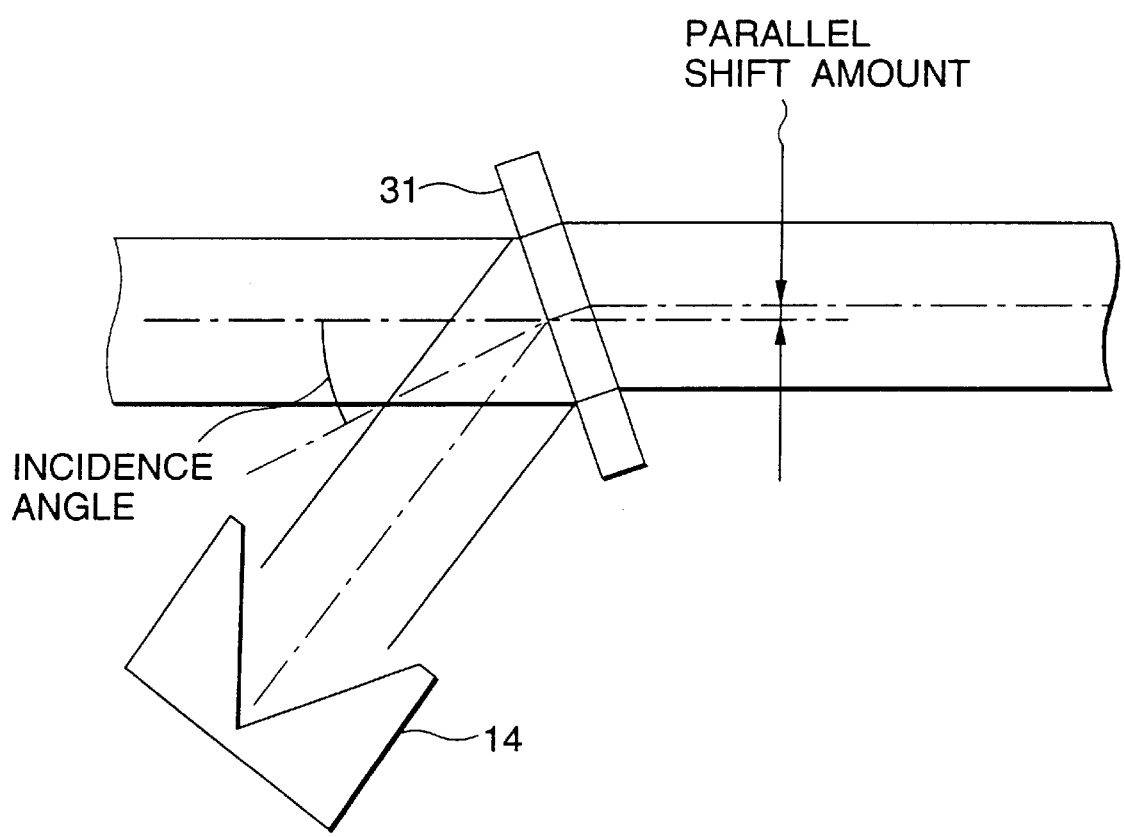
FIG. 9 is a schematic representation to show a part of a laser beam path.
Figure 10:
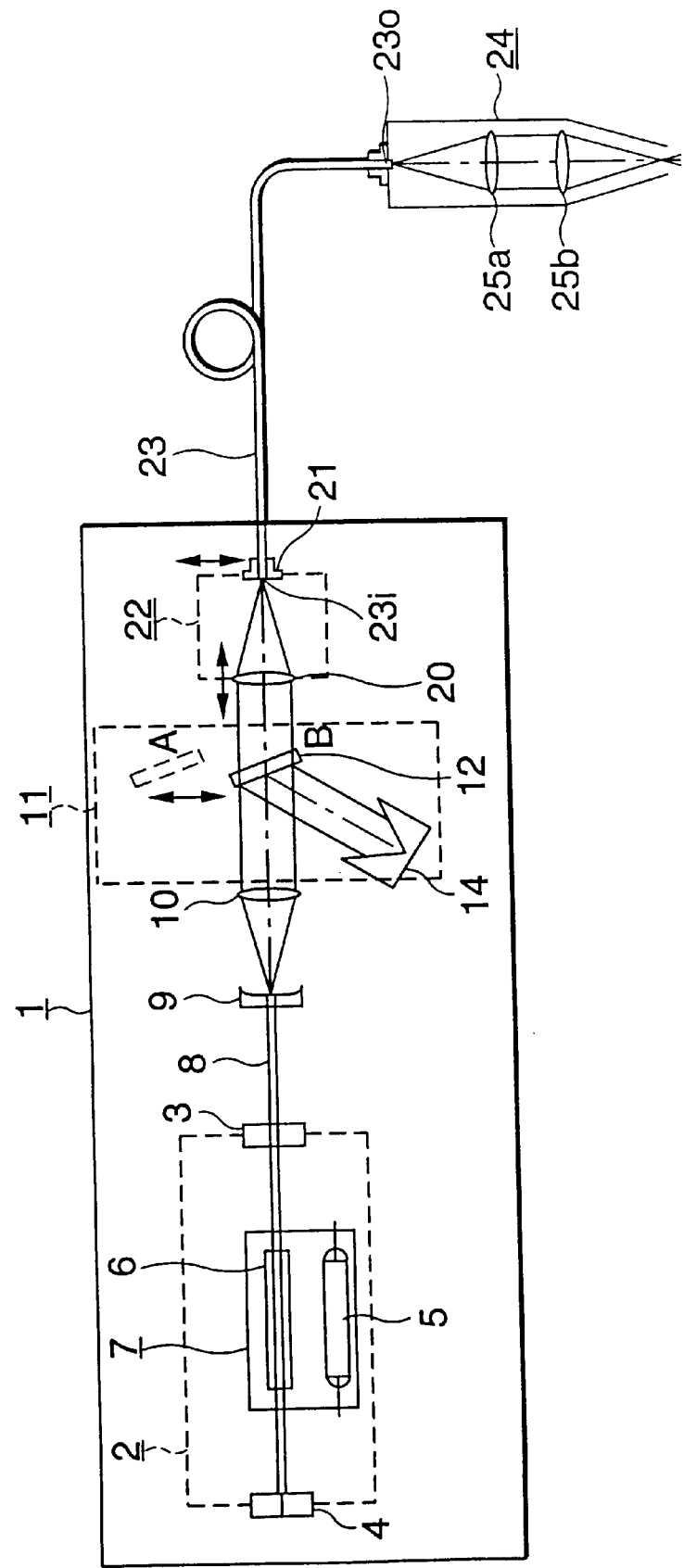
FIG. 10 is a schematic diagram to show the configuration of a solid-state laser apparatus in a related art.

The beam shutter 11 placed between the collimating lens 10 and the fiber incidence section 22 is provided with the reflecting mirror 31 for reflecting most of the laser beam 8 and allowing a part thereof to pass through. When the laser beam passes through the reflecting lens 31, a parallel shift in the laser beam path occurs as shown in FIG. 9. The parallel shift amount grows as the incidence angle of the laser beam 8 on the reflecting mirror 31 grows. If the parallel shift amount grows, a shift from the actual beam directly reaching the condensing lens 20 not via the reflecting mirror 31 also grows, and a shift from the adjustment position based on the laser beam passing through the reflecting mirror 31 also grows. In practical use, if the incidence angle of the laser beam 8 on the reflecting mirror 31 is 15 deg or less, an adjustment can be made substantially with no problem and it can be acknowledged that the parallel shift lies in a range with no problem in practical use.

From the above-described viewpoint, the incidence angle may be small, but if it is made too small, the necessary space for the whole laser apparatus including the damper becomes large, impairing the practical use. Therefore, it is practical to configure the laser apparatus so as to set the incidence angle of the laser beam on the reflecting mirror in the range of 8 deg to 15 deg.

As described throughout the specification, according to the invention, there can be provided a laser apparatus (good in maintenance) for making it possible to make a precise, easy, and objective adjustment to a fiber incidence section of a laser oscillator independent of the experience of each adjustment worker, if an SI-type optical fiber is used as an optical fiber.

What is claimed is:

1. A laser apparatus comprising:

a laser resonator for emitting a laser beam, an optical fiber, on which the laser beam transmitted from said laser resonator through a beam transmission optical path is made incident, for transmitting the laser beam to a workpiece, laser beam output measurement means for measuring laser beam output in an annular pattern at a periphery of a beam pattern of the laser beam emitted from said optical fiber, and fiber incidence adjustment means for adjusting incidence of the laser beam on said optical fiber based on an output from said laser beam output measurement means, wherein said laser beam output measurement means comprises:

a first aperture member having a first opening for allowing the annular pattern at the periphery of the beam pattern of the laser beam to pass through, a second aperture member having a second opening for allowing a circular pattern at a center of the beam pattern to pass through, and a power meter for measuring laser beam output of the laser beam passing through the first or second opening.

2. The laser apparatus as claimed in claim 1, wherein said laser beam output measurement means has said first and second aperture members that can be replaced together with hold members.

3. A laser apparatus comprising:

a laser resonator for emitting a laser beam, an optical fiber, on which the laser beam transmitted from said laser resonator through a beam transmission optical path is made incident, for transmitting the laser beam to a workpiece, laser beam output measurement means for measuring laser beam output in an annular pattern at a periphery of a beam pattern of the laser beam emitted from said optical fiber, and fiber incidence adjustment means for adjusting incidence of the laser beam on said optical fiber based on an output from said laser beam output measurement means, wherein said laser beam output measurement means comprises:

a first aperture member having a first opening for allowing the annular pattern at the periphery of the beam pattern of the laser beam to pass through; and a second opening for allowing a circular pattern at a center of the beam pattern to pass through, the first and second openings being exclusively switched for use, and a power meter for measuring laser beam output of the laser beam passing through the first or second opening.

4. The apparatus of claim 1, wherein the optical fiber is an SI (step index) type fiber.

5. The apparatus of claim 4, wherein the laser beam has an annular shape and is generated at a position corresponding to a numerical aperture (NA) value.

* * * * *